United States Patent

[11] 3,567,948

[72] Inventors John B. Oke
 Altadena;
 Rudolph E. Schild, South Pasadena, Calif.
[21] Appl. No. 815,728
[22] Filed Apr. 14, 1969
[45] Patented Mar. 2, 1971
[73] Assignee the United States of America, as represented by the Secretary of the Navy

[54] METHOD AND APPARATUS FOR IMPROVING THE QUANTUM EFFICIENCY OF PHOTOTUBES
 9 Claims, 5 Drawing Figs.
[52] U.S. Cl. .................................................. 250/216,
 250/207, 250/213
[51] Int. Cl. ................................................ H01j 39/12
[50] Field of Search .......................................... 250/207,
 213, 216, 228; 313/65, 102

[56] References Cited
 UNITED STATES PATENTS
2,474,098 6/1949 Dimmick ..................... 250/207X
2,758,217 8/1956 Scherbatskoy ............... 250/207X
2,964,636 12/1960 Cary ............................ 250/216X
3,226,557 12/1965 Goodman ..................... 250/216X
3,415,990 12/1968 Watson ........................ 250/213X Primary Examiner—Walter Stolwein
Attorneys—R. I. Tompkins and Paul N. Critchlow ABSTRACT: An end-on photomultiplier tube has a fused quartz dome covering its light-receiving face plate or window and further has its photocathode interfaced with the window and with the tube vacuum. The dome is a partial hemisphere so shaped that, in combination with the window thickness, the two members form a true hemisphere centered on the cathode. An incident light beam passing through the dome and directed onto the cathode center is reflected back into the dome from both the inner and outer interfaces of the cathode. The exterior surface of the dome lying in the path of these reflected beams is aluminized and, since the radius of curvature of the dome is centered on the cathode, these reflected beams are normal to the aluminized surface and thus re-reflected and reimaged back onto the cathode center. The arrangement achieves quantum efficiency gains by permitting a multiple photon traversal of the cathode and by controlling the angle of incidence to promote maximum interface reflectance. Also the reduction in size of the effective photocathode area minimizes photomultiplier dark current.

INVENTORS
JOHN B. OKE
RUDOLPH E. SCHILD

BY

ATTORNEY

METHOD AND APPARATUS FOR IMPROVING THE QUANTUM EFFICIENCY OF PHOTOTUBES

BACKGROUND OF THE INVENTION

The invention relates to phototubes and, in particular, to phototube applications employing a multiple-reflection technique to improve the quantum efficiency of the tubes.

Experimental uses of multiple reflection techniques are reported in prior art literature and are capable of achieving significant gains in quantum efficiency. For example, B.E. Rambo, in a paper "Improved Long Wavelength Response of Photoemissive Surfaces," Air Force Avionics Laboratory Tech. Doc. Rpt. AL TDR 64–19, p. 1, 1964 has reported promising experimental data and similar data is reported in a paper by J. L. Gumnick, "Improved Quantum Efficiency Laser Detectors," Air Force Avionics Laboratory Tech. Rept. AFAL-TR-65–190, p. 1, 1965.

Rambo obtained data using a prism multiple-bounce technique illustrated in FIG. 1 of the accompanying drawings which, as may be noted, is labeled "Prior Art." As shown, a prism is mounted on the window portion of the glass envelope of an end-on photomultiplier to direct an incoming beam onto the peripheral portion of a photocathode lying directly beneath the window in flush contact with it. The beam on striking the interfaces of the photocathode, is reflected or bounced in a zigzag path substantially the full width of the photocathode and the gain apparently results from the plural refractions of the photons in the beam into the cathode. Thus, each time the beam is refracted into the cathode, a fraction of its photons may be absorbed to produce the desired photoemission. Due to the multiplicity of the refractions a greater percentage of the photons in the incident beam may be effectively absorbed.

Such experimental techniques, however, do not appear practical when applied to certain applications or uses, such as use in astronomical work. For example, in astronomical photoelectric photometry and spectrophotometry of stars, it is necessary to allow the starlight to pass through a diaphragm in the focal plane of the telescope and, because the star image appears to change in size and wander erratically in the telescope, the focal plane diaphragm must be larger than the star image itself. The erratic wandering of the image may result from small telescope motions, or tracking errors, or effective variations in the refraction index of the atmosphere (seeing). To maintain signal uniformity as the star image wanders, a field lens is employed to image the telescope objective on the cathode of the photomultiplier tube and, unless the imaging is done moderately well, quantitative measurements are not possible. In any practical multiple reflection method, this image quality therefore must be maintained. Another factor which also must be considered arises from the fact that astronomical sources are faint and it becomes important to minimize the photomultiplier dark current. Consequently, it is necessary to minimize the effective photocathode area, a fact which places severe limitations on any multiple reflection technique.

With these two requirements in mind, it rather readily can be appreciated that the "Prior Art" configuration of FIG. 1 clearly violates the requirements regarding both the image quality and the cathode size. In particular, the image quality is not likely to be maintained because of the relatively erratic bouncing of the beam in its zigzag path across the cathode. Also, the effective cathode area must be increased to accommodate the excursion of the multiple bounce or reflections.

OBJECTS OF THE INVENTION

It is therefore an object of the present invention to provide a method and apparatus for utilizing the multiple reflection technique in practical phototube applications.

A related object is to achieve significant quantum efficiency gains at practical operating wavelengths.

Another related object is to preserve the image quality of an incoming beam during its multiple reflections and re-reflections from and into the cathode of a phototube.

Still another object is to utilize the multiple reflection technique in a closely-controlled manner capable of taking advantage of the dependency of gain upon the angle of incidence of the incoming beam.

Another object is to permit the use of relatively small cathodes in practical applications utilizing multiple reflection techniques for astronomical applications or the like.

More specifically, an object of the invention is to utilize the multiple reflection technique in astronomical applications which employ a field lens to image the telescope objective on the cathode of a photomultiplier tube, the arrangement being one which carefully maintains the quality of the field lens image during the multiple reflections.

Generally considered, these and other objects which will become apparent are achieved in the manner already described in the foregoing "Abstract of the Disclosure." However, as readily will be apparent, the invention is not restricted to photomultiplier tubes and, of course, the materials forming certain of the components, such as the dome and the light-reflective section of the dome, can be other than the fused quartz and the aluminum described in the "Abstract."

BRIEF DESCRIPTION OF THE DRAWING

The invention is illustrated in the accompanying drawing of which.

DETAILED DESCRIPTION OF THE INVENTION

Figure 1:
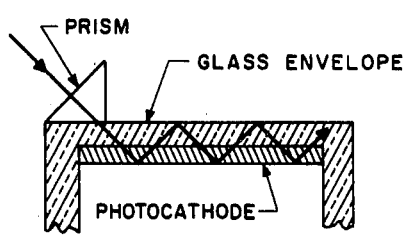
FIG. 1 is a schematic illustrating a prior art multiple reflection technique applied to a photomultiplier tube, the light-receiving end of the tube being shown in a fragmentary manner and in section.
Figure 2:
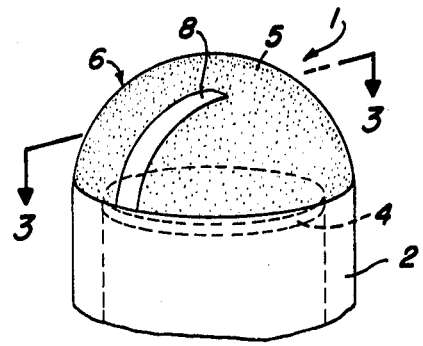
FIG. 2 is a fragmentary perspective of the domed tube showing one embodiment of the present invention.

Referring to the drawings, FIG. 2 shows a photomultiplier tube 1 having a cylindrical sidewall 2 and an end wall 3 subsequently referred to as the tube window. A photocathode 4 is disposed interiorly of or beneath window 3 in flush engagement with it and, according to conventional practice, the interior of the tube is a vacuum to facilitate propagation of the photoelectric current derived from the photocathode upon absorption of the photons of a light beams. As will be apparent, such a cathode has an outer interface with the window and an inner interface with the tube vacuum.

A special down or cover member 6 in the form of a partial hemisphere is attached to the tube window by means of a suitable oil or grease layer 7 having an index of refraction of about 1.5. Preferably, the dome may be formed of quartz or glass and a selected portion or section of its exterior surface is aluminized by application of an aluminum coating 5 shown in FIG. 3. In the embodiment illustrated in FIGS. 2 and 3, the entire surface is aluminized except for an entrance slot 8 (FIG. 2) which is left uncoated to admit light from the exterior of the dome onto the photocathode.

Figure 4:
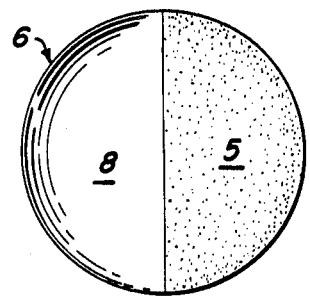
FIG. 4 is a top view of a dome used in another embodiment of the invention.

The obvious function of aluminum coating 5 is to reflect light transmitted to it and, as will become apparent, the only section which requires aluminization is that section used for such reflection purposes. Thus, another embodiment, such as the one shown in FIG. 4, might be preferred for commercial as opposed to experimental purposes. As there seen, only one half of the interior surface of the dome is aluminized, the other half being used to admit the light to the tube. However, even less than one half of the interior surface actually requires the reflective coating, particularly if the angle of incidence of the light beam is relatively fixed. In such situations the reflecting area also becomes relatively fixed and therefore quite small. The slot arrangement of FIG. 2 was employed to obtain certain experimental data to be considered.

Figure 3:
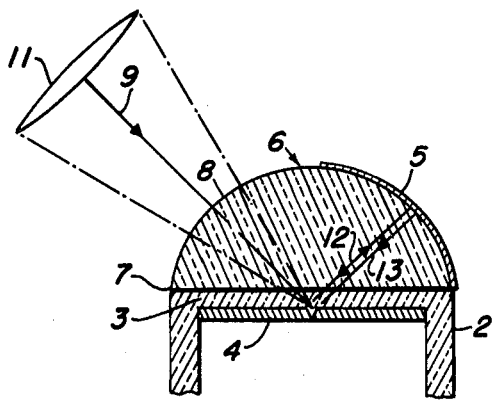
FIG. 3 is a section taken along lines 3–3 of FIG. 2 and also includes a lens arrangement intended to schematically illustrate the paths of the incident and reflected light beams.

A further significant feature apparent in FIG. 3 is that dome 6 is, as stated, only a partial hemisphere to the extent that when attached to tube window 3 the combined partial hemisphere and tube window form a true hemisphere centered on the cathode. Viewed in another manner, the exterior surface of the dome has a radius of curvature centered on the cathode so that a beam of light, such as beam 9, directed onto the center of cathode 4 has a portion of its photons reflected as a beam which strikes the aluminum coating normal to its radius of curvature so as to cause the reflected beam to be re-reflected back to the center of the cathode.

As has been indicated, the present apparatus primarily is intended for astronomical applications, although other uses obviously are contemplated. Such astronomical applications employ a telescope and the starlight to be detected and measured conventionally passes through a diaphragm in the focal plane of the telescope. However, because of the previously explained erratic wandering of the star image, the focal plane diaphragm must be larger than the star image itself and to maintain signal uniformity, a field lens, such as lens 11 (FIG. 3) is employed to image the telescope objective on the cathode of the photomultiplier tube. This imaging, in turn, must be done at least moderately well and the image quality must be maintained during its reflected paths both from the cathode and the aluminized coating. As may be recalled, relative inability of prior art arrangements to maintain image quality has precluded quantitative measurements particularly in astronomical work or the like.

The present arrangement, as shown in FIG. 3, may employ a lens 11 to image the telescope objective onto the center of photocathode 4. Consequently, photons reflected from the outer or inner surfaces or interfaces of the photocathode are re-reflected or reimaged by the aluminized surface directly back upon their point or origin at the cathode's center. Significant quantum efficiency gains can be achieved since the FIG. 3 arrangement employs a multiple-reflection technique in which photons reflected from the interfaces of the photocathode are returned to their point of origin for a second opportunity to transverse the cathode and possibly be absorbed For example, as may be noted in FIG. 3, beam 9 has a relatively small fraction of its photons reflected at the window-cathode interface along path 12 and these photons, in turn, will be returned to their point of origin at the cathode interface where they have a good chance of being usefully refracted into the cathode material. Other photons in beam 9 are refracted onto the cathode-vacuum interface and then reflected along path 13 into the aluminized dome. These photons then are returned and again may be refracted into the cathode before being reflected by the cathode-vacuum interface back along the path of beam 9. The major portion of the photons thus pass through the cathode at least four times and have at least four opportunities to be usefully absorbed.

Figure 5:
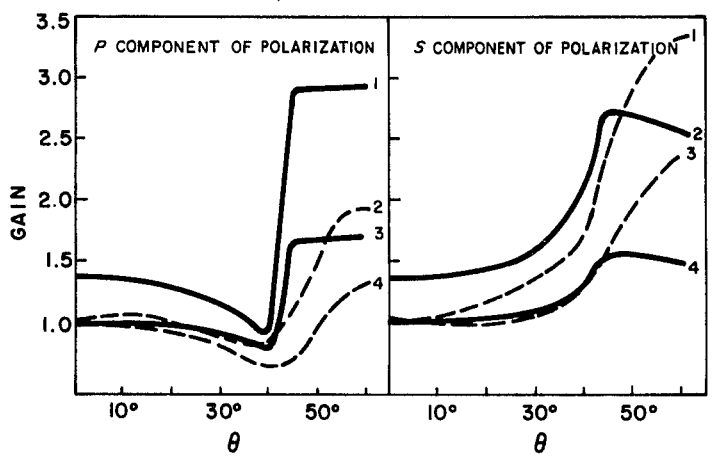
FIG. 5 is a plot comparing gain data for an aluminized dome of hemisphere with similar gain data for an unaluminized hemisphere.

The arrangement therefore employs the multiple reflection technique of the prior art and achieves significant quantum efficiency gains. At the same time, however, the image quality of the incident beam is maintained permitting quantitative measurements to be made. Further, the arrangement permits the angle of incidence to be varied. Thus, it is clear from FIG. 3 that by rotating the photomultiplier tube with its attached dome relative to the incoming light beam, the angle of incidence of light on the photocathode can be varied from about 0° (normal incidence) to almost 90°. As is known, quantum efficiency has a significant dependency on the angle of incidence and this fact further is demonstrated in the FIG. 5 plot yet to be described. Consequently, the ability to select an angle of incidence which produces maximum gain is of considerable importance since this angle also fixes the angle of incidence of the beam when it is re-reflected by the aluminized surface.

By proper selection of the incidence, loss of photons into the tube vacuum is minimized. The FIG. 3 arrangement also permits the use of a relatively small effective cathode area since only the central portion of the cathode is employed.

The quantum efficiency gain has been established experimentally using the phototube arrangement illustrated in FIGS. 2 and 3. In the experiment, most of the data was obtained with standard production ITT photomultipliers. Nine FW 118 tubes having S-1 cathodes and seven FW 130 tubes with S-20 cathodes were measured. The effective photocathdes were circles of 8.0 mm. diameter. All measurements were made with tubes operating as photomultipliers at dry ice temperatures as in actual astronomical applications. The tubes also were all operated at nearly the same overall multiplication, and signals were measured by means of high speed, pulse counting techniques standard at many observatories.

In the experiments, sensitivity of the photocathodes was measured as a function of wavelength of incident angles ranging from 0° to 60°. The gains in sensitivity at 55° incidence relative to the sensitivity at normal incidence are given in Table I for wavelengths of interest and, as will be noted in Table I, the gains were those of TTT FW 130 photomultiplier tubes having S-20 cathodes. Similar data was obtained for the S-1 tubes, and, although these gains were smaller and less wavelength dependent, support the information provided in Table I. It also should be noted that, according to the test data supplied by ITT, all of the S-20 tubes should have average or better than average quantum efficiencies at 8000 A°, a fact that demonstrates that the gain achieved by use of the aluminized dome is achieved regardless of the initial average of better than average tube quality. The gains reported in Table I are ratiometric figures representing the gain ratio of an aluminized dome relative to an unaluminized dome at normal incidence. Table I. Quantum Efficiency Gains in ITT FW 130 Photomultiplier Tubes (S20), Angle of Incidence 55°

| Wavelength, A. | FW 130 Tube Serial Number | | | | | | |
|---|---|---|---|---|---|---|---|
| | 016704 | 106606 | 106609 | 116601 | 126612 | 126614 | 126615 |
| 5,000 | 2.29 | 1.78 | 1.72 | 2.07 | 1.51 | 1.57 | 1.73 |
| 5,500 | 2.16 | 2.02 | 1.85 | 2.34 | 1.60 | 1.74 | 1.83 |
| 6,000 | 2.39 | 2.29 | 1.99 | 2.68 | 1.72 | 1.90 | 2.00 |
| 6,500 | 2.60 | 2.46 | 2.14 | 3.02 | 1.91 | 2.04 | 2.16 |
| 7,000 | 2.84 | 2.65 | 2.25 | 3.24 | 2.11 | 2.23 | 2.32 |
| 7,500 | 3.13 | 2.79 | 2.35 | 3.45 | 2.30 | 2.30 | 2.50 |
| 8,000 | 3.67 | 2.97 | 2.43 | 3.77 | 2.64 | 2.45 | 2.67 |
| 8,500 | 4.35 | 3.45 | 2.64 | 4.70 | 2.86 | 2.73 | 3.23 |
| 8,800 | 4.39 | 3.24 | 2.78 | 4.94 | 2.64 | 2.82 | 2.92 |

It is clear that the phenomena resulting in the sensitivity gains shown in Table I are intimately related to reflections that occur in the vicinity of the photocathode. Because light reflections by dielectrics are strongly influenced by the state of polarization of the light, it became apparent that studies involving linearly disposed light should be made to facilitate a comparison with computer studies which linearly disposed light permits.

Polarized light, according to standard notation, has a $p$ component and an $s$ component and, in subsequent discussion, standard notation is sued to define the $p$ component of polarization as that component lying in the plane defined by the incident and reflected beams. The $s$ component then is the component perpendicular to the $p$ component and, of course, perpendicular to the direction propagation. Thus, at the point of reflection, the $s$ component is tangent to the reflecting surface. In the experiments, a piece of polarizing film (Polaroid HMP'B) was introduced into the light beam a short distance in front of the field lens. Two representative tubes were selected and measurement were made with the polarizing file rotated to the $s$ or $p$ orientation as the angle of incidence was increased from 0° to 60°. Measurements were made only to 8000 A° since the polarizing film begins to lose effectiveness beyond this wavelength.

The results of one of the experiments is shown in FIG. 5 in which the continuous-line curves 1 and 3 show computed data and the dash-line curves 2 and 4 show measured data. Curves 1 and 2 are for the aluminized hemispheres shown in FIG. 2, while curves 3 and 4 are for comparable unaluminized hemispheres Thus, in reading the plot of the $p$ component of FIG. 5, curves 1 and 3 represent a comparison of computed data for the aluminized and unaluminized hemispheres while curves 2 and 4 provide measured data for comparison between the aluminized and unaluminized hemispheres. However, in the volt of the $s$ component, curves 1 and 3 compare measured data, while curves 2 and 4 compare computed data.

From the results shown in FIG. 5, it may be seen that the measured and predicted curves show a large increase in gain between angles 40° and 45°, but that the increase in gain is larger when the hemisphere is aluminized. The measured gain curves for angles less than 40° show much better agreement with theory for the unaluminized hemisphere than for the aluminized ones, although this apparent discrepancy probably is due to a particular normalization problem encountered in the experiments at small angles of incidence. More specifically, in the experiments, the entrance slot in the aluminized hemisphere was extended slightly beyond the top of the hemisphere so that there would be no possibility of vignetting at the small angles of incidence. However, as a result of the extension of the slot, the reflected beam for small angles of incidence is not returned to the photocathode. In the computer program, on the other hand, it is assumed that such reflection does occur. Another apparent discrepancy which involves the failure of the observed $p$ curve to cross the $s$ curve to produce a very high gain for large angles of incidence, likely is due to an assumption that the photocathode can be treated as a pure dielectric whereas, instead of being a pure dielectric, there may have been free silver in the photocathode giving rise to a metallic reflection component. Other experiments in which and S-20 photocathode was investigated for metallic reflection produced an elliptical polarization indicating a small component of metallic reflection at the photocathode. Thus, the assumption of pure dielectric reflection at the glass-photocathode interface is not strictly valid and the computer study apparently contains this discrepancy.

In making the computer study, various assumptions were made which probably should be mentioned for evaluation purposes. Thus, the cathode was assumed to be a uniform medium characterized by some index of fraction $n_2$. Since the incoming beam always strikes the hemisphere normally, it was unnecessary to consider the small loss of 4 percent at this surface, such a loss being reported in the literature. It further was assumed that the hemisphere has an index of refraction $n_1 = 1.5$ and is optically joined to the window so that no reflection occurs at the window-hemisphere surface. As another assumption, it was considered that light reflects internally off the aluminized hemisphere with an efficiency of 90 percent. Finally, it was assumed that the light beam travelling through one cathode thickness is attenuated by a factor $A$. The secant dependence on refracted angle, which this factor $A$ should include, is negligible since the index of refraction in the photocathode is so large that the refracted beam is never far from normal. Using the above model and the usual Fresnel relations, it is straightforward to compute the total light absorbed by the photocathode for the angles of incidence.

From the foregoing description, it should be apparent that a method and apparatus is provided for significantly increasing the quantum efficiencies of phototubes, such as photomultipliers, and that the method and apparatus are particularly applicable for astronomical and other applications where maintenance of the field lens image quality is required and where small cathodes are desirable. The method is particularly suitable for increasing the quantum efficiencies of photomultipliers used to obtain quantitative measurements in the red and near infrared wavelengths, although one reason for this particular suitability is that many commercially-available cathodes already are optimized for blue light measurements as opposed to measurements in the red and near infrared. As the comparisons of measurements with the computer model show, there are two principal factors contributing to the gain, these being the total internal reflection of the cathode and the reflection of the beam at the aluminized surface of the hemisphere. Finally, although the method and apparatus described is particularly suitable for astronomical research, applications in other fields obviously are possible.

Obviously many modifications and variations of the present invention are possible in the light of the above teachings. It is therefore to be understood that within the scope of the appended claims the invention may be practiced otherwise than as specifically described.

We claim:

1. Apparatus for measuring light emanating as a beam from a source comprising:
   a phototube having a light-receiving end;
   a thin platelike photocathode carried by the tube at its light-receiving end;
   a dome member mounted on and covering said light-receiving end;
   said member having a substantially hemispherical exterior surface with a radius of curvature centered on said photocathode;
   a portion of said dome member being light-transmissive and said portion being disposed to admit said light beam obliquely along said radius onto said photocathode center; and
   a portion of said dome member being light reflective and being disposed to reflect back to said photocathode center such fractions of said light beam as initially are reflected onto it from said center, whereby the photoelectrically effective area of said photocathode essentially is limited to its center and said initial and return reflections have plural opportunities to pass into said effective area.

2. The apparatus of claim 1 wherein said apparatus further includes:
   a telescope having a focusing lens for imaging its objective on said center of the photocathode.

3. The apparatus of claim 2 wherein;
   said light transmissive portion of the dome member is of sufficient area to admit said objective at an angle of incidence greater than about 40° relative to said photocathode, said light reflective portion reimaging said incident beam on said photocathode center.

4. The apparatus of claim 3 wherein said angle of incidence is about 55°.

5. The apparatus of claim 3 wherein said tube is a photomultiplier having a flat end wall providing a light-transmissive window, said cathode being disposed internally of the window and interfaced with both the window and the vacuum of the tube.

6. The apparatus of claim 5 wherein said dome is formed of quartz and said light-reflecting section is an aluminum coating adhered to the quartz.

7. A method if improving the quantum efficiency of a phototube used with a focusing lens for imaging a telescopic objective on the photocathode of the tube, the phototube being of a type in which the photocathode is disposed flushly adjacent a wall of the tube, the method comprising:
   admitting said focused image obliquely on the center area of said photocathode at an angle of incidence capable of promoting maximum reflection of said image from the interface of the cathode and said tube wall;
   reimaging such fractions of light as are reflected from said center back onto the center; and
   whereby the image quality is maintained, the quantum efficiency of the tube being improved by the multiple traversals of the cathode and by minimizing the escape of photons into said tube vacuum.

8. The method of claim 7 wherein said image is admitted at an angle of incidence relative to said cathode of greater than 40°.

9. The method of claim 8 wherein said angle is 55°.